United States Patent [19]

Zimmermann

[11] Patent Number: 5,709,192
[45] Date of Patent: Jan. 20, 1998

[54] METHOD FOR DETERMINING THE DIFFERENCES BETWEEN NON-UNIFORM CYLINDER TORQUE MOMENTS IN AN INTERNAL COMBUSTION ENGINE AND APPLICATION OF THE METHOD

[75] Inventor: Uwe Zimmermann, Fell, Germany

[73] Assignee: MTU Motoren- und Turbinen-Union Friedrichshafen GmbH, Friedrichshafen, Germany

[21] Appl. No.: 712,589

[22] Filed: Sep. 13, 1996

[30] Foreign Application Priority Data

Sep. 14, 1995 [DE] Germany .................. 195 34 057.4
Dec. 23, 1995 [DE] Germany .................. 195 48 604.8

[51] Int. Cl.⁶ ........................... F02D 41/04; F02D 41/32
[52] U.S. Cl. ................................. 123/436; 73/117.3
[58] Field of Search ......................... 123/436, 419; 73/116, 117.3

[56] References Cited

U.S. PATENT DOCUMENTS

| | | | |
|---|---|---|---|
| 4,357,662 | 11/1982 | Schira et al. | 364/431.08 |
| 4,475,511 | 10/1984 | Johnson et al. | 123/436 |
| 4,495,920 | 1/1985 | Matsumura et al. | 123/436 |
| 4,535,406 | 8/1985 | Johnson | 364/431.08 |
| 4,667,634 | 5/1987 | Matsumura et al. | 123/357 |
| 4,697,561 | 10/1987 | Citron | 123/339 |

FOREIGN PATENT DOCUMENTS 0474652  12/1990  European Pat. Off. .

Primary Examiner—Willis R. Wolfe
Assistant Examiner—Hien T. Vo
Attorney, Agent, or Firm—W. G. Fasse; W. F. Fasse

[57] ABSTRACT

Relative differences between cylinder torque moments are individually determined for each cylinder in a multicylinder internal combustion engine in which individual cylinders may be switched off. The torque moment differences are ascertained indirectly when the engine is subject to inner and outer resistance moments and to the inertia moments of all masses to be accelerated. Under these conditions the crankshaft r.p.m. is measured and the r.p.m. signal is split into components for the individual cylinders by applying the superposition principle of linear systems. The first r.p.m. is determined when all cylinders work. The second r.p.m. is determined with all cylinders but one working and the second r.p.m. is deducted from the first r.p.m. Gradually one cylinder after the other is switched off and the respective differences in the r.p.m. are ascertained. These r.p.m. differences are allocated to the ignition compression and are compared with a difference r.p.m. of a reference cylinder. This comparing provides a torque difference for each cylinder relative to the reference cylinder. The results are then treated statistically, for example by the least square method to determine numerical values which are converted into closed loop control signals for controlling injection fuel quantities for each cylinder so that each cylinder will contribute the same moment component to the total torque moment of the engine.

9 Claims, 5 Drawing Sheets

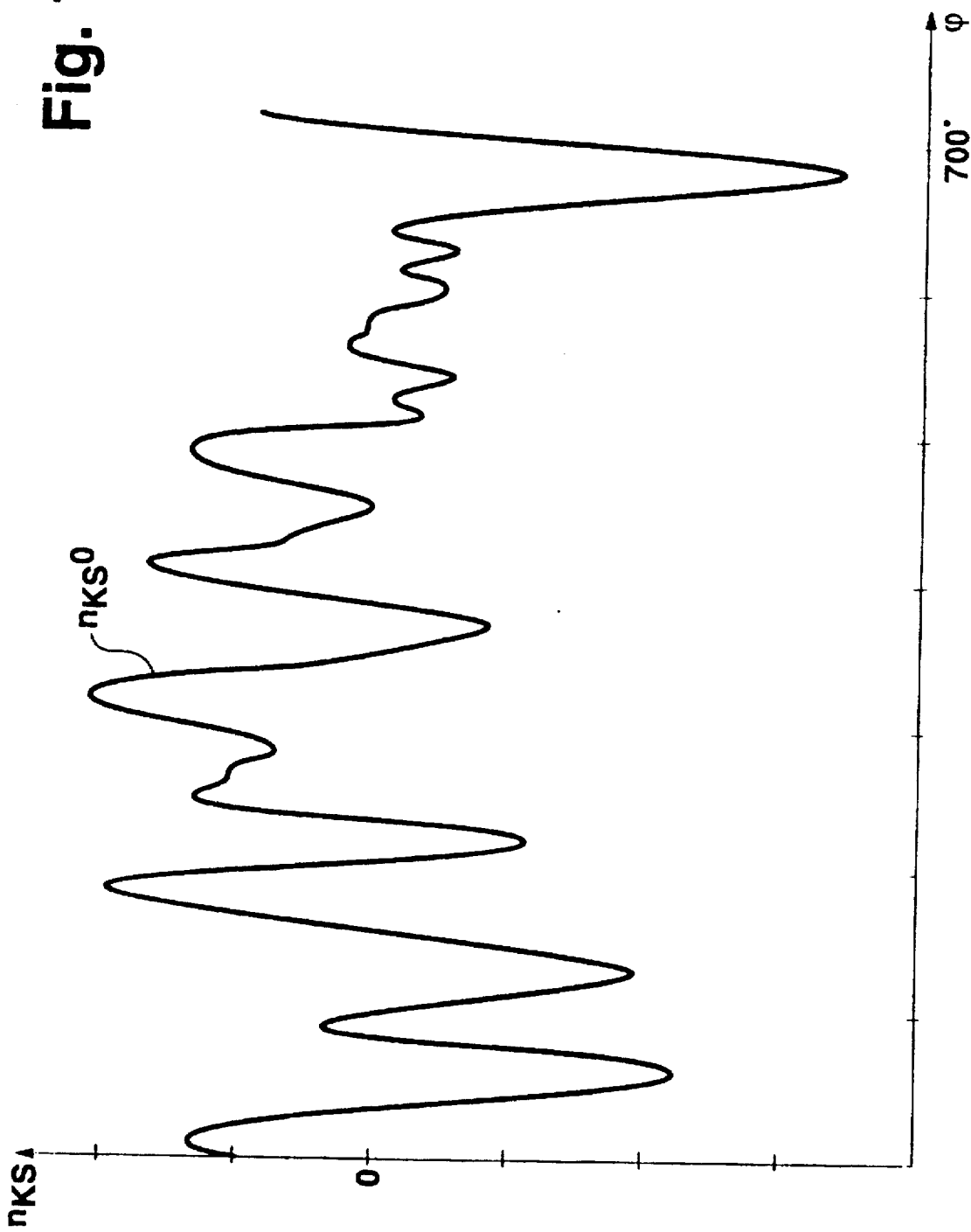

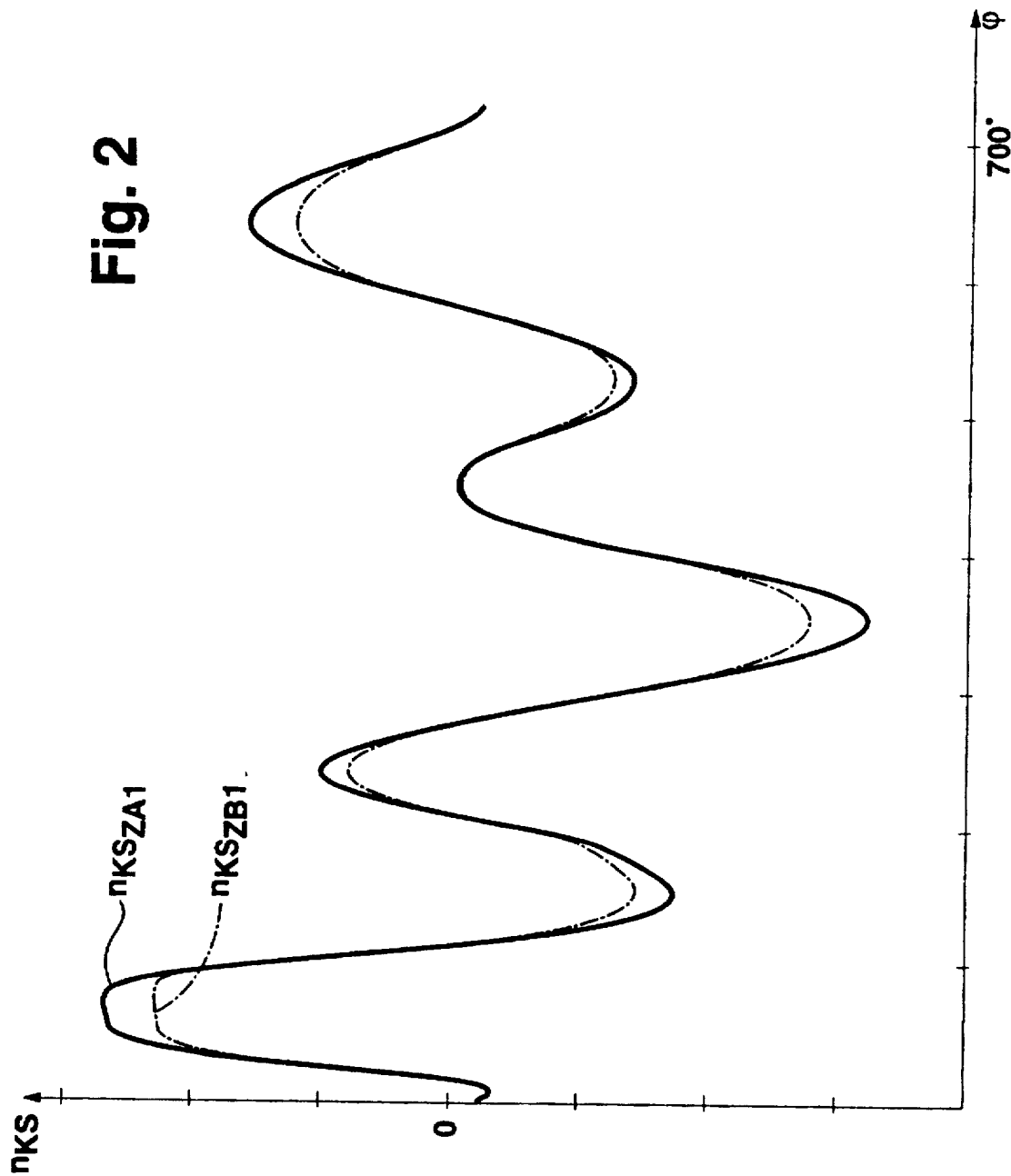

```
┌─────────────────────────────────────────────────┐
│ MEASURE r.p.m. CURVES (VALUES) n + 1 TIMES;     │
│ n = NUMBER OF CYLINDERS; 1 → r.p.m. OF          │
│ ENGINE, ALL CYLINDERS OPERATING                 │
│ r.p.m.$_{(n)}$ = ALL CYLINDERS RUN;             │
│ r.p.m.$_{(n-i)}$ = i CYLINDER IS SWITCHED OFF   │
└─────────────────────────────────────────────────┘
                        ↓
┌─────────────────────────────────────────────────┐
│ STORE r.p.m. CURVE DATA IN MEMORY AS A          │
│ FUNCTION OF CRANKSHAFT ANGLE $\varphi$          │
└─────────────────────────────────────────────────┘
                        ↓
┌─────────────────────────────────────────────────┐
│ FILTER r.p.m. VALUES TO ELIMINATE VERY HIGH     │
│ AND/OR VERY LOW FREQUENCY COMPONENTS            │
└─────────────────────────────────────────────────┘
                        ↓
┌─────────────────────────────────────────────────┐
│ ELIMINATE MEAN OR CONSTANT VALUES FROM r.p.m.   │
│ VALUES                                          │
└─────────────────────────────────────────────────┘
                        ↓
┌─────────────────────────────────────────────────┐
│ CALCULATE r.p.m. DIFFERENCES                    │
│ r.p.m.$_{(n)}$ = r.p.m.$_{(n-1)}$;              │
│ r.p.m.$_{(n)}$ = r.p.m.$_{(n-2)}$; ETC.         │
│ TO PROVIDE r.p.m. DIFFERENCE VALUES             │
└─────────────────────────────────────────────────┘
                        ↓
┌─────────────────────────────────────────────────┐
│ RANDOMLY SELECT ONE CYLINDER AS THE REFERENCE   │
│ CYLINDER E.G. A1                                │
└─────────────────────────────────────────────────┘
                        ↓
┌─────────────────────────────────────────────────┐
│ FOURIER TRANSFORMATION OF r.p.m. DIFFERENCE     │
│ VALUES TO FORM FOURIER TRANSFORMATION r.p.m.    │
│   $n_{KS_{ZZyl}}(j\omega)$  IN POLARIC REPRESENTATION │
└─────────────────────────────────────────────────┘
                        ↓
            (continues in Fig. 3B)
```

Fig. 3A from Fig. 3A

```
┌─────────────────────────────────────────────────────────┐
│ REDUCING ALL r.p.m. DIFFERENCE VALUES TO THE            │
│ REFERENCE CYLINDER E.G. A1 (BY EQUATION 3.20)           │
└─────────────────────────────────────────────────────────┘
```

DIVISION TO FORM RATIO BETWEEN THE REFERENCE CYLINDER FREQUENCY RESPONSE CHARACTERISTIC OF THE REFERENCE ROTARY OSCILLATION SYSTEM (CRANKSHAFT, ROTARY OSCILLATION DAMPER, CLUTCH, ETC. FROM REFERENCE CYLINDER TO r.p.m. MEASURING POINT), AND THE FREQUENCY RESPONSE CHARACTERISTIC OF THE ROTARY OSCILLATION SYSTEM OF THE CYLINDER UNDER CONSIDERATION (CYLINDER UNDER CONSIDERATION TO r.p.m. MEASURING POINT), AND MULTIPLICATION OF RATIO WITH FOURIER TRANSFORMED r.p.m. OF THE CYLINDER UNDER CONSIDERATION (CYLINDER TO BE REDUCED) (EQUATION 3.21)

BACK-TRANSFORMATION OF THE REDUCED DIFFERENCE r.p.m. VALUES FROM THE FREQUENCY DOMAIN INTO THE CRANK ANGLE DOMAIN

DETERMINATION OF RELATIVE DIFFERENT CYLINDER TORQUE MOMENTS CORRESPONDING TO DIFFERENT INJECTION FUEL QUANTITIES FOR EACH CYLINDER (EQUATION 3.23 ($x_{zyl}$) UNDER ASSUMPTION THAT THE COMPRESSION IS SUBSTANTIALLY THE SAME AND THE INJECTION CRANK ANGLE IS THE SAME FOR ALL CYLINDERS WITHIN THE WORK CYCLE

Fig. 3B

METHOD FOR DETERMINING THE DIFFERENCES BETWEEN NON-UNIFORM CYLINDER TORQUE MOMENTS IN AN INTERNAL COMBUSTION ENGINE AND APPLICATION OF THE METHOD

FIELD OF THE INVENTION

The invention relates to a method for determining relative differences between non-uniform torque components contributed by the individual cylinders to the total output torque of the crankshaft in an internal combustion engine, particularly multi-cylinder combustion engines in which individual cylinders may be switched off.

BACKGROUND INFORMATION

In connection with monitoring the operational condition of an internal combustion engine, it is important, to know the individual torque components or contribution of each cylinder to the total torque output of the engine. However, it is not possible to directly measure these individual torque components of the individual cylinders nor the engine output torque which is the sum of these individual cylinder torque components, because inner and outer resistance torques as well as the inertia moment of all masses to be accelerated by a piston internal combustion engine loaded by these torques, must be taken into account. Non-uniform individual cylinder torque components can be caused by deviations in the fuel supply quantities supplied to the individual cylinders, by timing errors in the ignition, and other factors, even including ignition failures of individual cylinders. While it is important to measure the torque moments, neither individual cylinder torque moments nor the total engine torque output can be measured directly. Instead, values are measured which permit making indirect conclusions regarding the torque moment.

European Patent Publication EP 0,474,652 B1 (Klink et al.), published on Aug. 3, 1994, discloses a method for measuring unbalances in an internal combustion engine, whereby r.p.m. signals of the crankshaft are evaluated since these signals are directly derived from the torque and it is simple to measure these signals. The known method or methods, however, are based on large crank angle spacings between individual cylinder ignitions as are present, for example, in four cylinder or six cylinder engines. Therefore, these known methods cannot be used in connection with multi-cylinder engines having substantially shorter intervals between ignitions in individual cylinders.

OBJECTS OF THE INVENTION

In view of the above it is the aim of the invention to achieve the following objects singly or in combination:

- to determine differences between individual cylinder torques of internal combustion engines having any desired number of cylinders by evaluating a crankshaft r.p.m. characteristic curve;
- to provide information regarding the individual cylinder torques, specifically regarding differences between individual cylinder torques relative to a randomly selected reference cylinder in an internal combustion engine independently of disturbing influences;
- to provide individual cylinder torque information without the need of allocating individual time slots to the cylinders in a measuring operation during one work cycle;
- to provide a method for ascertaining the individual cylinder torque moment in such a way that the number of cylinders does not influence the quality of the torque moment signal;
- to provide a control signal for the individual control of the operation of each cylinder so that each cylinder develops the same torque component as any other cylinder in an internal combustion engine;
- to control the fuel supply to the individual cylinders of an internal combustion engine in such a way that torque differences between individual cylinders are equalized, regardless of the cause for such differences; and
- to supply such measured and controlled quantities of fuel to the individual cylinders that each cylinder develops the same torque regardless of manufacturing tolerances.

SUMMARY OF THE INVENTION

The above objects have been achieved according to the invention by the combination of the following steps. First, a constant r.p.m. of the engine is measured while a constant and equal quantity of fuel is injected into each cylinder. Second, the r.p.m. is measured again and again each time with one cylinder switched off, n measurements are made, wherein n=number of cylinders. Then, the r.p.m. is analyzed to ascertain the relative torque differences between individual cylinders of the engine by deducting the first r.p.m. signal from the second r.p.m. signal by applying the superpositions principle of linear systems. In this way an individual or isolated consideration of the r.p.m. component caused by the ignition pressure of each individual signal is achieved over the respective work cycle corresponding to the duration of all ignitions of all cylinders in the engine. Still as part of the analysis, the individual ignition compression r.p.m. component of any randomly selected reference cylinder is individually measured and compared with the ignition compression r.p.m. of any of the other cylinders of the engine and the respective difference is registered. The r.p.m. is measured in each instance at the flywheel or at the rotational or torsion vibration damper. Measurements may be made on the power side KS or on the opposite side KGS.

The invention takes into account that the rotation of the crankshaft caused by the cyclical operation of the piston internal combustion engine is uneven under the influence of gas explosion forces and mass forces and that these uneven processes are periodically repeated within a work cycle. Further, the invention takes into account that the non-uniform rotational movement of the crankshaft is proportional to the work or power delivered by the crankshaft.

The engine r.p.m. is a value that is simple to measure. In fact, this value or signal is automatically available in the r.p.m. controller. Thus, it is advantageous to determine the individual cylinder torque components on this basis. On the other hand, the torque moment of a Diesel engine is the result of a synthesis of individual torques that result from the gas compressions in the cylinders and from the mass forces of the piston and piston rods and also including unknown disturbing moments. These disturbing moments are caused by friction, by the drive of the wheels, and by the load components. However, their values are unknown.

It is an advantage of the invention that the steps employed according to the invention are substantially not sensitive to the above mentioned disturbing influences, which are cancelled out in the analysis. Thus, the different torque components of the individual cylinders can be determined by analyzing the respective r.p.m. signal curves. Accurate signals are obtained according to the invention because disturbing influences that adversely affect the r.p.m. are eliminated for example the influence of mass forces, of friction, of compression and load changes have been eliminated by applying the superposition principle.

It is necessary for carrying out the present method that individual cylinders of the engine may be switched off during the operation of the engine. The combination of switching off individual cylinders with the mathematical superposition principle make it possible to individually ascertain and display the torque component of each individual cylinder relative to the total torque output of the engine.

A special advantage is seen in that the superposition of two r.p.m. curves that have been measured under identical operating conditions over one work cycle makes sure that all periodically recurring r.p.m. motion components cancel each other when the proper sign (+ or −) is selected. Only the true undiluted differences between the superimposed signal curves remain. Thus, if one compares the r.p.m. values, or rather the r.p.m. curves one of which represents the motor running with all cylinders and the other represents the motor running with one cylinder shut-off, one obtains the direct r.p.m. or rather torque component that is allocatable to the switched off cylinder. If one further makes additional preconditions, namely that the beginning of the fuel injection relative to the respective crankshaft angular position and relative to the compression characteristic in all cylinders is equal, the signal evaluation is further simplified by avoiding additional adaptation steps. Furthermore, one obtains with this procedure of the invention directly and exclusively the ignition moment of the respective cylinder.

As a result, the present method makes it possible to individually display the moments of the individual cylinder without any time consuming subdivision of the measuring operation during one work cycle. Therefore, the crankshaft angular spacings between individual ignitions and thus the number of the cylinders in the engine being checked, remain without influence on the quality of the ascertained torque signal.

Another important advantage of the invention is obtained by using the present method in engines with an electronic fuel supply control whereby individual cylinders may be intentionally switched off as is the case, for example, in the so-called "common rail" injection system. The measuring results of the relative differences of the r.p.m. curves make it possible to make direct conclusions regarding the relative injection fuel quantity differences. Therefore, it is now possible to provide, based on these conclusions an engine operation control signal that equalizes or "tunes" the fuel injection quantities for each of the cylinders of an engine, thereby "balancing" the cylinders regarding their torque components. The fuel injection quantity variations that may occur, for example due to manufacturing tolerances, thus may be simply and reliably compensated in order to realize in each individual cylinder the same mean compressions as in any one of the other cylinders of the engine. As an important advantage of the invention it has become possible for the first time to accept more economical manufacturing tolerances in the production of the piston cylinder structural unit. Satisfying the high precision tolerance requirements according to the prior art is no longer required. This is so because the dimensional tolerances and power differences resulting therefrom in individual cylinders can now be equalized individually for each cylinder by respective fuel injection variations. The manufacturing costs are thereby substantially reduced since high tolerances need not be maintained.

BRIEF DESCRIPTION OF THE DRAWINGS

In order that the invention may be clearly understood, it will now be described, by way of example, with reference to the accompanying drawings, wherein:

FIG. 1 shows the crankshaft r.p.m. deviation curve without mean value while all cylinders of the engine are operating;

FIG. 2 shows the ignition pressure r.p.m. deviation curve without mean value for the cylinders A1 and B1 of a sixteen cylinder Diesel V-engine;

FIGS. 3A and 3B show a flow diagram illustrating the program sequence for the several calculations performed according to the invention to form engine control signals.

Figure 4:
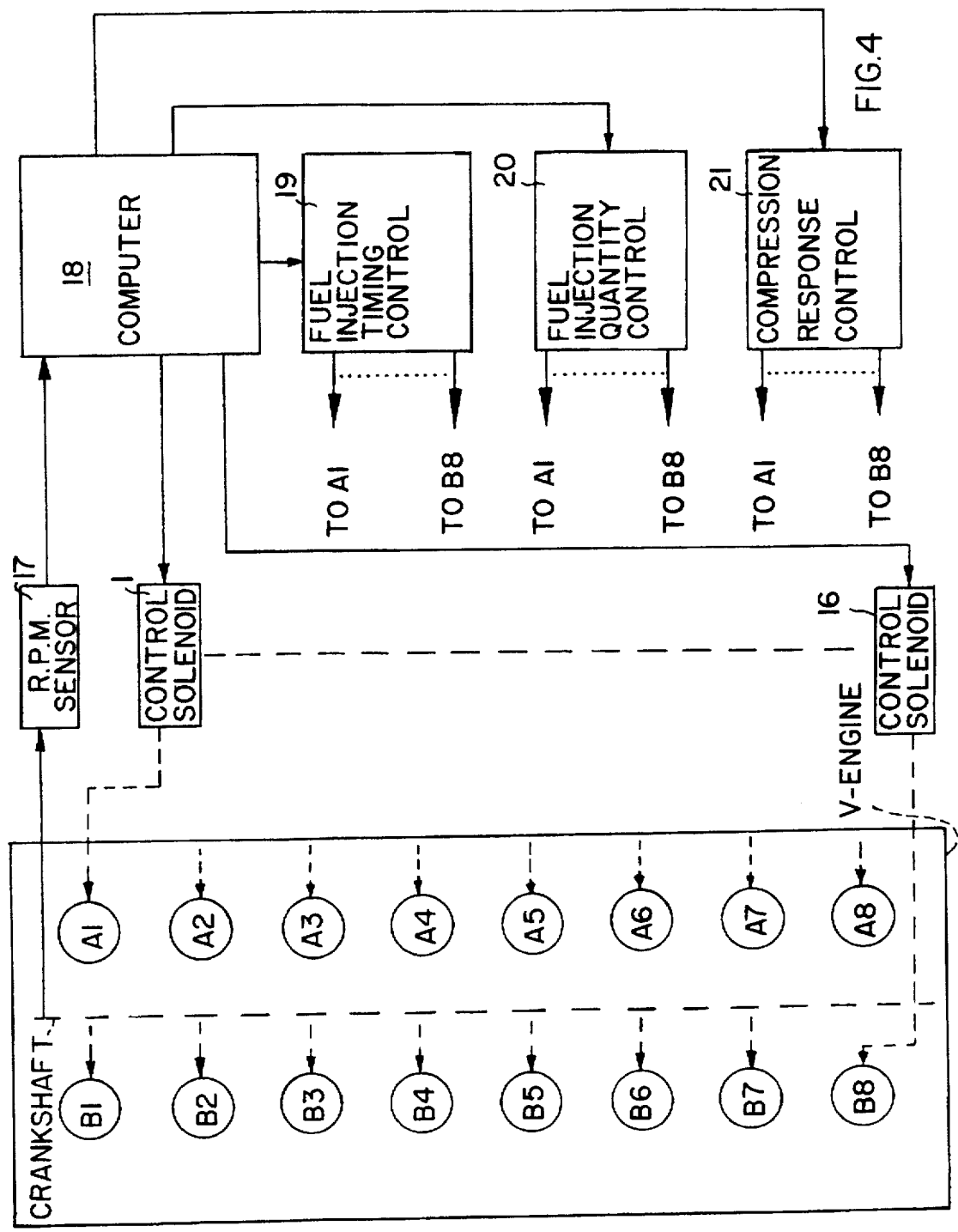
FIG. 4 is a block diagram of a circuit for performing the present measurements and using the resulting control signals in closed loop fashion for controlling the engine in such a way that each cylinder will contribute the same torque moment component to the total torque moment of the engine crankshaft.

DETAILED DESCRIPTION OF A PREFERRED EXAMPLE EMBODIMENT AND OF THE BEST MODE OF THE INVENTION

For the determination of the relative ignition compression torque of the individual cylinders A1 to A8 and B1 to B8 shown symbolically in FIG. 4, an r.p.m. signal or curve is first divided into individual r.p.m. components by applying the super-position principle of linear systems. This division or evaluation rests on the rotary oscillation model of the Diesel engine, for example the engine r.p.m. $n_{KS}$ on the power side (KS) is composed of individual r.p.m. which are derived from the individual cylinder torques as well as a fictive dissipation component $n_{Stor}$ such as influence of mass forces, of the friction, of the compression, of the gas exchange and of the load as follows:

$$n_{KS} = n_{KS}^{A1} + n_{KS}^{B1} + n_{KS}^{A2} + n_{KS}^{B2} + \ldots + n_{KS}^{An} + n_{KS}^{Bn} + n_{Stor} \qquad (3.1)$$

If one splits the torque of a cylinder into a mass torque $M_m^{zyl}$ an ignition compression torque, $M_Z^{zyl}$, a compression and gas exchange torque $M_K^{zyl}$ and a dissipation torque $M_R^{zyl}$ one can write the individual cylinder moment as follows:

$$M^{zyl} = M_m^{zyl} + M_Z^{zyl} + M_K^{zyl} + M_R^{zyl} \qquad (3.2)$$

As a result it is possible to split the r.p.m. once more on the basis of the individual cylinder torque components in the equation 3.1 as follows:

$$n_{KS}^{zyl} = n_{KS_m}^{zyl} + n_{KS_Z}^{zyl} + n_{KS_K}^{zyl} + n_{KS_R}^{zyl} \qquad (3.3)$$

wherein

Zyl=[A1,B1,A2,B2, . . . ,An,Bn]     (3.4)

n=maximum number of cylinders allocated in one row of a V-type engine.

This superposing principle can now be applied in order to eliminate the influence of the mass forces, of the friction, of the compression, and of the gas exchange on the r.p.m. For this purpose the individual cylinder KS r.p.m. are compared in a rated setting "0", wherein an injection quantity and an injection timing are constant. In this point the r.p.m. of the entire engine is expressed as follows:

$$n_{KS}^0 = n_{KS}^{A1^0} + n_{KS}^{B1^0} + \ldots + n_{KS}^{An^0} + n_{KS}^{Bn^0} + n_{S\ddot{o}r}^{0} \quad (3.5)$$

If now one cylinder at a time is switched off while all other cylinders are operated at the rated setting "0", one obtains r.p.m. curves as is now described with reference to the example of switching off the cylinder A1, whereby the r.p.m. of the engine is expressed as follows:

$$n_{KS}^{A1} = n_{KS}^{A1^{A1}} + n_{KS}^{B1^{A1}} + \ldots + n_{KS}^{An^{A1}} + n_{KS}^{Bn^{A1}} + n_{S\ddot{o}r}^{A1} \quad (3.6)$$

wherein $$n_{KS}^{B1^{A1}} = n_{KS}^{B1^0}; n_{KS}^{A2^{A1}} = n_{KS}^{A2^0}; \ldots n_{KS}^{Bn^{A1}} = n_{KS}^{Bn^0} \quad (3.7)$$

By forming the difference between the r.p.m. components, namely between equations 3.5 and 3.6, one obtains $$\Delta n_{KS}^{A1} = n_{KS}^0 - n_{KS}^{A1} = n_{KS}^{A1^0} - n_{KS}^{A1^{A1}} \quad (3.8)$$

By splitting equation (3.8) in its components as shown in equation (3.3) one obtains $$\Delta n_{KS}^{A1} = n_{KS_m}^{A1^0} + n_{KS_Z}^{A1^0} + n_{KS_K}^{A1^0} + n_{KS_R}^{A1^0} - n_{KS_m}^{A1^{A1}} - n_{KS_Z}^{A1^{A1}} - n_{KS_K}^{A1^{A1}} - n_{KS_R}^{A1^{A1}} \quad (3.9)$$

Assuming that the torques caused by compression, by charge changes, and by friction are the same regardless whether cylinder A1 is working or not working, one obtains $$M_m^0 = M_m^{A1}; M_K^0 = M_K^{A1}; M_R^0 = M_R^{A1} \quad (3.10)$$

whereby equation (3.9) can be simplified as follows:

$$n_{KS_{ZA1}} = \Delta n_{KS}^{A1} = n_{KS_Z}^{A1^0} - n_{KS_Z}^{A1^{A1}} \quad (3.11)$$

The difference r.p.m. signal $n_{KS_{ZA1}}$ is thus only a function of the torque caused by the ignition pressure $M_Z^{A1}$. This difference signal is a synthetic signal. It could be measured or determined theoretically if only the ignition compression of the cylinder A1 is effective on the crankshaft. Thus, in the following text this moment is referred to as the ignition pressure r.p.m.

In the same manner just described, all other ignition pressure r.p.m. are determined for each individual cylinder A1 to A8 and B1 to B8 of the V-engine. Once these individual ignition pressure r.p.m. have been determined, the difference between these values for each of the cylinders is determined relative to a respective value of a randomly selected reference cylinder, for example A1 or B1 or any other cylinder. It is, however, necessary to keep the selection once made so that all difference values for the remaining cylinders are determined relative to the same reference cylinder in order to obtain an objectively comparable expression. In the following explanations the cylinder A1 is used as the reference cylinder.

The relationship between the ignition pressure moment $M_Z^{Zyl}$ and the KS ignition pressure r.p.m. $n_{KS_{Zyl}}$ of this cylinder (A1, Zyl) describes the frequency response characteristic $F_{KS_{Zyl}}$ that is present for each of the cylinders. This relationship also expresses the individual transfer characteristic of the respective cylinder. The ignition pressure torque is correspondingly transferred with the frequency response characteristic $F_{KGS_{Zyl}}$ to obtain the force counterside (KGS) r.p.m. $n_{KGS_{Zyl}}$. The frequency response characteristics of different cylinders are not equal in their effect because they are effective on different crank formations of the crankshaft.

It follows that if the ignition pressure moment $M_Z^{A1}$ of the cylinder A1 is identical to the ignition pressure moment $M_Z^{A2}$ of the second cylinder A2, the ignition pressure r.p.m. $n_{KS_{ZA1}}$ will differ from the r.p.m. ignition pressure $n_{KS_{ZA2}}$. Thus, the following equation applies $$F_{KS_{An}} = F_{KS_{Bn}} \text{ but } F_{KS_{An}} \neq F_{KSAm}; F_{KS_{Bn}} \neq F_{KS_{Bm}}, \quad (3.15)$$

wherein n≠m and n and m are integers.

The following equation applies to the reference cylinder A1 in the polaric representation:

$$n_{KS_{ZA1}}(j\omega) = F_{KS_{A1}} * M_Z^{A1}(j\omega) \quad (3.16)$$

and correspondingly for any random cylinder Zyl $$n_{KS_{ZZyl}}(j\omega) = F_{KS_{Zyl}} * M_Z^{Zyl}(j\omega) \quad (3.17)$$

If one assumes that the cylinder Zyl delivers a moment that is the $K_{Zyl}$-fold of the moment of the cylinder A1, angularly displaced by the ignition angle $\phi_{Zyl}$, then one can present this fact in the frequency range as follows:

$$M_Z^{Zyl}(j\omega) = K_{Zyl} * M_Z^{A1}(j\omega) * e^{(-j*\phi_{Zyl})} \quad (3.18)$$

By inserting equation (3.17) and (3.18) into the equation (3.16) and performing a transformation we obtain:

$$n_{KS_{ZZyl}}(j\omega) = K_{Zyl} * \frac{F_{KS_{Zyl}}}{F_{KS_{A1}}} * e^{(-j*\phi_{Zyl})} * n_{KS_{ZA1}}(j\omega) \quad (3.19)$$

* means multipication or $$n_{KS_{ZA1}}(j\omega) * K_{Zyl} * e^{(-j*\phi_{Zyl})} = \frac{F_{KS_{A1}}}{F_{KS_{Zyl}}} * n_{KS_{ZZyl}}(j\omega) \quad (3.20)$$

wherein the right side of the equation can be expressed as follows:

$$\frac{F_{KS_{A1}}}{F_{KS_{Zyl}}} * n_{KS_{ZZyl}}(j\omega) = n'_{KS_{ZZyl}}(j\omega) \quad (3.21)$$

The right-hand side of equation (3.20) represents the ignition compression r.p.m. of the cylinder under consideration, reduced to the reference cylinder A1 (3.21). The relative ignition compression r.p.m. $n'_{KS_{Zyl}}$ is obtained after the back transformation of (3.21).

In order to ascertain the difference between the ignition compression moments of the individual cylinders relative to the reference cylinder A1, the reduced ignition compression r.p.m. signal is transcribed into a vector $x_{Zyl}$ without any mean or constant value over the crankshaft angle relative to the ignition top dead center (TDC) of the cylinder beginning with the crankshaft angle $\phi$=zero. Correspondingly, the ignition compression r.p.m. signal of the reference cylinder A1 is transcribed to a vector $X_{A1}$ without any mean or constant value relative to the ignition upper dead point (OT) of the reference cylinder A1. With this presentation one obtains the static transfer factor $K_{Zyl}$ from the equation:

$$x_{ZYL} = K_{ZYL} * x_{A1} \quad (3.22)$$

Thus, the static transition characteristic between the ignition pressure r.p.m. is expressed by the transfer factor $K_{Zyl}$. For an estimate free of bias, one can assume that the estimated value for the transfer of the ignition compression moments and the estimated value for the transfer factor $K_{Zyl}$ of the respective transition characteristic of the r.p.m. curve are equal to each other. Thus, it becomes possible to ascertain the transfer factor $K_{Zyl}$ by way of statistical calculation methods, such as minimizing the square of the error e in accordance with the least squares method or the ratio of the cross correlation function and the auto-correlation function of the ignition compression r.p.m. for $\tau=0$ based on the following equation:

$$K_{Zyl} = \frac{\phi_{x_{A1}x_{Zyl}}(0)}{\phi_{x_{A1}x_{A1}}(0)} = \frac{\sum_{i=0}^{N-1} x_{Zyl}(i) * x_{A1}(i)}{\sum_{i=0}^{N-1} x_{A1}^2(i)} \quad (3.23)$$

The transfer factor $K_{Zyl}$ thus obtained, represents the ratio of the moment of the cylinder Zyl to the moment of the reference cylinder A1 and thus it is a measure for the relative difference between the ignition compression moment of that particular cylinder relative to the reference cylinder A1.

An example will now be described with reference to FIGS. 1 and 2 for a sixteen cylinder Diesel V-engine. In the example the difference of the relative cylinder torques of a cylinder pair A1, B1 will be determined. This Diesel V-engine is equipped with an accumulator injection system electronically controlled in closed loop fashion. Thus, it is possible to intentionally switch off individual cylinders A1, B1 . . . A8, B8. It is also possible to precisely control the injected fuel quantity and the timing of the beginning of the injection.

Compared to the derivation of the relative ignition compression moment of any random cylinder relative to a reference cylinder, the derivation of the ignition compression moment differences of the cylinders forming a pair, becomes simpler due to the engine construction, because, in a V-sixteen cylinder Diesel engine the cylinder pairs A1 and B1 . . . A8 and B8 each are effective on the same crankshaft crank configuration. Therefore, the cylinders of a pair Ai, Bi have the same frequency response characteristic $F_{KS_{Zyl}}$. If the ignition pressure torques and thus the fuel quantities for the cylinders of a pair are equal to each other, it follows that both ignition compression r.p.m. must also be equal to each other $n_{KS_{ZA1}} = n_{KS_{ZB1}}$, except for the ignition angle difference between the two cylinders A1 and B1. From this fact it is now possible to derive the relative difference of the ignition pressure torques $M_Z^{Zyl}$ between the cylinder A1 and the cylinder B1 relative to each other. If one now writes the ignition compression r.p.m. $n_{KS_{ZA1}}$ and the ignition compression r.p.m. $n_{KS_{ZB1}}$ for the other cylinder B1 of a pair as a vector as described above, namely $x_{A1}$ and $x_{B1}$, then both vectors $x_{A1}$ and $x_{B1}$ are congruent to each other over one work cycle if both ignition compression moments of both cylinders are equal to each other. If there is a difference between the ignition compression moments of the cylinders A1 and B1 of a pair by the factor K1, then one can write for the r.p.m. characteristic:

$$x_{A1} = K_1 * x_{B1}. \quad (3.13)$$

Accordingly, it is now possible to calculate the transfer factor K1 from the general equation:

$$K_n = \frac{\phi_{x_{Bn}x_{An}}(0)}{\phi_{x_{Bn}x_{Bn}}(0)} = \frac{\sum_{i=0}^{N-1} x_{An}(i) * x_{Bn}(i)}{\sum_{i=0}^{N-1} x_{Bn}^2(i)} \quad (3.14)$$

wherein N is the number of data for which an estimate shall be made and n is the index for the cylinder under consideration.

For determining the relative cylinder moments according to the invention, first the KS r.p.m. $n_{KS}^0$ in a rated setting "0" are measured or sensed. Then, the KS r.p.m. characteristic is determined. For ascertaining these r.p.m. $n_{KS}^0$, the Diesel engine is controlled to a rated setting "0" with constant load while each cylinder receives the same injected fuel quantity and the fuel injection into all cylinders starts at the same crank angle position before TDC.

FIG. 1 shows the KS r.p.m. characteristic $n_{KS}^0$ without any formation of a mean value over the crankshaft revolution angle $\phi$ and for a work cycle of two revolutions with $\phi=720°$. The r.p.m. characteristic $n_{KS}^0$ curvature represents a work cycle in which all sixteen cylinders of the Diesel engine are operated.

FIG. 2 shows the ignition pressure r.p.m. characteristics $n_{KS_{ZA1}}$; $n_{KS_{ZB1}}$. The curvatures or characteristics are obtained as a result of performing the second step according to the present invention for each of the cylinders A1 and B1. The second step involves a test sequence during which measurements are made over the duration of at least one work cycle of the engine. In the first run according to the second step, the cylinder A1 is not provided with fuel so that the cylinder A1 is switched off while all other cylinders B1, A2, B2 . . . A8, B8 are injected with the same fuel quantity as in the work point 0.

During this operation of the cylinders B1, A2, B2 and so forth, the crankshaft r.p.m. $n_{KS}^{A1}$ is measured and recorded to form the r.p.m. signals. In the second run cylinder B1 is switched off while cylinders A1, A2, B2, . . . A8, B8 are operated in order to measure the crankshaft r.p.m. $n_{KS}^{B1}$. The foregoing test sequence can be repeated sequentially for all cylinder pairs, whereby fourteen further work cycles are used to determine the respective r.p.m. curves for the remaining cylinders. During these additional tests the cylinders A2, B2 are first switched off one after the other, then the cylinders A3 followed by B3 and so forth.

In the third method step according to the invention the ascertained r.p.m. curvatures $n_{KS}^{A1}$ and $n_{KS}^{B1}$ are superposed on the r.p.m. signal $n_{KS}^0$ of the Diesel engine with all cylinders running in order to ascertain the respective difference in accordance with the equations:

$$\Delta n_{KS}^{A1} = n_{KS}^0 - n_{KS}^{A1} = n_{KS_{ZA1}}; \Delta n_{KS}^{B1} = n_{KS}^0 - n_{KS}^{B1} = n_{KS_{ZB1}} \quad (3.8)$$

As a result of this superposition one obtains the ignition compression r.p.m. signals $n_{KS_{ZA1}}$, $n_{KS_{ZB1}}$ which are allocated only to the respective switched off cylinder A1 or B1 as indicated by the respective parameters. In this described example embodiment these curves are only a function of the moment $M_Z^{Zyl}$ caused by the ignition pressure of the cylinder A1, B2 respectively.

Thus, the ignition pressure r.p.m. signals $n_{KS_{ZA1}}$, $n_{KS_{ZB1}}$ provide the pure ignition compression moment share of the cylinders A1 and B1 without any disturbing influences. FIG. 2 shows these ignition pressure r.p.m. curves $n_{KS_{ZA1}}$, $n_{KS_{ZB1}}$.

Now that the ignition compression r.p.m. $n_{KS_{ZA1}}$, $n_{KS_{ZB1}}$ or the respective individual ignition moment shares of the cylinders A1 and B1 are available, method step 4 of the invention is performed by correlating these r.p.m. or cylinder torque shares. For this purpose the cylinder B1 is used as a reference cylinder and equation (3.14) is applied to calculate the static transfer factor K1 which is a measure for the relative difference between the ignition compression torques of the cylinders A1 and B1.

Starting with the numerical value of the factor K1 which represents the relative r.p.m. or ignition moment difference between the cylinders A1 and B1 one may now directly make a corresponding conclusion regarding the differences in the injection quantities of these cylinders relative to each other. As a result, the ratio of the ignition compression torques provides through a further evaluation the filling differences between the cylinders A1 relative to the reference cylinder B1. Corresponding values for all cylinders can be ascertained and the respective signals are then used in a closed loop fashion to control the quantity of fuel injected into each cylinder.

FIGS. 3A and 3B show a flow diagram of the program sequence performed in the computer shown in FIG. 4. The calculations were performed on a personal computer equipped with a Pentium processor and using software known under the registered trademark "MATLAB"® sold by Mathworks. The instructions in each box of the flow diagram are self-explanatory.

FIG. 4 shows a block diagram of a closed loop control circuit arrangement for a cylinder balancing operation according to the invention. The Diesel V-engine, as in the above example, has sixteen cylinders symbolically shown as circles A1 to A8 and B1 to B8. The dashed line out of each cylinder symbolically indicates a connection to a respective solenoid controlled injection valve. The solenoids switch off the respective cylinders for the measurement of a respective crankshaft r.p.m. according to the second step of the method of the invention. In the example shown in FIG. 4 sixteen solenoids 1 to 16 are symbolically connected by the dashed lines to the respective cylinder. All solenoids are connected to the computer 18 which electronically controls the engine operations. A sensor 17 is used to measure the engine r.p.m. e.g. at the crankshaft or at the r.p.m. regulator (not shown) when the engine runs with all cylinders working in the "0" working point and when individual cylinders are switched off.

The r.p.m. signals are supplied to the computer 18 where these signals are processed as described above in accordance with the program sequence shown in FIGS. 3A and 3B. The computer provides feedback control signals to control units 19, 20, and 21 for controlling, in closed loop fashion, any one or all of the fuel injection timing, the fuel injection quantity, and the compression, respectively. These control units provide control signals to the respective individual cylinder control which as such are part of conventional construction.

Thus, it is now possible to provide a transfer factor Kn representing the control input signal for the closed loop injection control, whereby any non-uniformities in the individual torque shares or components of the individual cylinders can be equalized by a respective controlled fuel injection quantity individually for each cylinder.

The invention has been described with reference to specific example embodiments, it will be appreciated that it is intended to cover all modifications and equivalents within the scope of the appended claims.

What is claimed is:

1. A method for determining relative differences in non-uniform cylinder torques of an internal combustion engine having a plurality of cylinders and operating with an engine r.p.m. under the load of inner and outer resistance moments and inertia moments of masses to be accelerated comprising the following steps:

(a) randomly selecting any one of said plurality of cylinders as a reference cylinder,
   (b) analyzing said engine r.p.m. to determine individual cylinder torques for each cylinder including said reference cylinder, and
   (c) forming a difference between a reference torque moment of said reference cylinder and torque moments of each remaining cylinder of said plurality of cylinders for determining said relative differences in said non-uniform cylinder torques.

2. The method of claim 1, further comprising converting said relative cylinder torque differences into respective control signals, and supplying said control signals in closed loop fashion as an additional input control value to a respective fuel control device, whereby, depending on the differences between the individual cylinder and the reference cylinder, the fuel injection quantities are equalized for all cylinders so that each cylinder will contribute the same moment component to the total torque of the engine.

3. The method of claim 1, wherein said analyzing step comprises:

(a1) measuring an engine r.p.m. signal when all cylinders of the engine are working and splitting said r.p.m. signal over at least one engine work cycle into specific cylinder r.p.m. components individually for each cylinder, thereby achieving a separate consideration of each ignition compression r.p.m. $n_{ZZyl}$ of each individual engine cylinder, and then (b1) comparing the ignition compression r.p.m. of said randomly selected reference cylinder with each ignition compression r.p.m. of each other engine cylinder to form respective difference values.

4. The method of claim 3, wherein said step (a) is performed by executing the following substeps:

(c1) ascertaining the r p.m. characteristic $n_{KS}^o$ of the engine with all cylinders operating, whereby the engine is controlled in closed loop fashion to operate at a defined working point (0) at which the crank r.p.m. is maintained constant and all cylinders receive the same injected fuel quantity;

(d) switching off one engine cylinder (Zyl) for at least one work cycle and again ascertaining an r.p.m. $n_{KS}^{Zyl}$ while all other engine cylinders are operating with the same fuel quantity as in said working point (0);

(e) repeating the r.p.m. measurement of step (d) for all cylinders of the engine; and (f) determining the ignition compression r.p.m. $n_{KS_{ZZyl}}$ for the individual engine cylinders as a difference of the r.p.m. ($n_{KS}^{Zyl}$, $n_{KS}^o$) ascertained in steps (c), (d) and (e), thereby applying the equation $$n_{KS_{ZZyl}} = n_{KS}^o - n_{KS}^{Zyl}.$$

5. The method of claim 3, further comprising a step (g) performed simultaneously with said steps ($c_1$), (d), and (e), said step (g) comprising equalizing in closed loop fashion relative to the ignition top dead center (TDC) the beginning of the fuel injection and the compression characteristic of all cylinders operated at the same time.

6. The method of claim 4, further comprising the following steps:

(h) transcribing said ignition compression r.p.m. ($n_{ZZyl}$) into a vector $x_{Zyl}$, determined in step (f) for each cylinder (Zyl) free of a mean value, over the crankshaft angle ($\phi$) relative to the ignition (TDC) of the cylinder (Zyl) beginning with the angle (0), (i) further transcribing into a vector ($x_{BZ}$) the ignition compression r.p.m. of the reference cylinder (BZ) free of a mean value over the crankshaft angle ($\phi$) relative to the ignition (OT) of the reference cylinder (BZ) beginning with (0); and (j) calculating the differences of the ignition compression r.p.m. components by determining a transfer factor ($K_{Zyl}$) according to the equation $$x_{Zyl} = K_{Zyl} \cdot x_{BZ}.$$

7. The method of claim 6, further comprising a step:

(k1) including calculating in step (j) the transfer factor ($K_{Zyl}$) by applying the least square method.

$$K_{Zyl} = \frac{\phi_{x_{BZ}x_{Zyl}}(0)}{\phi_{x_{BZ}x_{BZ}}(0)} = \frac{\sum_{i=0}^{N-1} x_{Zyl}(i) * x_{BZ}(i)}{\sum_{i=0}^{N-1} x_{BZ}^2(i)}$$

8. The method of claim 6, further comprising: a step (k2) including calculating in step (j) the transfer factor ($K_{Zyl}$) according to the equation:

$$K_{Zyl} = \frac{\phi_{x_{BZ}x_{Zyl}}(0)}{\phi_{x_{BZ}x_{BZ}}(0)} = \frac{\sum_{i=0}^{N-1} x_{Zyl}(i) * x_{BZ}(i)}{\sum_{i=0}^{N-1} x_{BZ}^2(i)}$$

wherein N corresponds to the number of data for which an estimate is being made.

9. A method for the individual determination of relative differences in nonuniform cylinder moments of an internal combustion engine, which is loaded by inner and outer resistance torques and by the inertia moment of all masses to be accelerated, and wherein each individual cylinder may be switched off, comprising the following steps:

(a) ascertaining an overall r.p.m. signal when all cylinders of the engine are operating, (b) sequentially switching off one cylinder and again ascertaining respective specific cylinder r.p.m. signals individually for each cylinder, (c) determining relative torque differences of individual cylinders relative to a randomly selected reference cylinder by analyzing said r.p.m. signals of the engine to provide relative ratio values representing cylinder moment differences; and generating engine control signals individually for each cylinder of the engine in response to said relative ratio values.

* * * * *

UNITED STATES PATENT AND TRADEMARK OFFICE
CERTIFICATE OF CORRECTION

PATENT NO. : 5,709,192　　　　　　　　　　　　Page 1 of 5
DATED : Jan. 20, 1998
INVENTOR(S) : Zimmermann It is certified that error appears in the above-identified patent and that said Letters Patent is hereby corrected as shown below.

On the title page:
under Assistant Examiner:　　replace "Hien T. Vo" by --Hieu T. Vo--;

Col. 6,　　line 6,　　replace " $F_{KS_{An}} = F_{KS_{Bn}}$ but $F_{KS_{An}} \neq F_{KS_{Am}}; F_{KS_{Bn}} \neq F_{KS_{Bm}},$ (3.15) "

by -- $F_{KS_{An}} = F_{KS_{Bn}}$ but $F_{KS_{An}} \neq F_{KS_{Am}}; F_{KS_{Bn}} \neq F_{KS_{Bm}}$ . (3.15) -- line 21,　　replace "$\phi_{Zyl}$" by --$\varphi_{Zyl}$--;

line 25,　　replace " $M_Z^{Zyl}(j\omega) = K_{Zyl} * M_Z^{AJ}(j\omega) * e^{(-j*\varphi_{Zyl})}$ (3.18) "

by -- $M_Z^{Zyl}(j\omega) = K_{Zyl} * M_Z^{AJ}(j\omega) * e^{(-j*\varphi_{Zyl})}$ (3.18) --

UNITED STATES PATENT AND TRADEMARK OFFICE
CERTIFICATE OF CORRECTION

PATENT NO. : 5,709,192
DATED : Jan. 20, 1998
INVENTOR(S) : Zimmermann It is certified that error appears in the above-identified patent and that said Letters Patent is hereby corrected as shown below.

Col. 6, line 30, replace "$n_{KS_{ZZyl}}(j\omega) = K_{Zyl} \cdot \frac{F_{KS_{Zyl}}}{F_{KS_{A1}}} \cdot e^{(-j \cdot \varphi_{Zyl})} \cdot n_{KS_{ZA1}}(j\omega)$ (3.19)"

by -- $n_{KS_{ZZyl}}(j\omega) = K_{Zyl} \cdot \frac{F_{KS_{Zyl}}}{F_{KS_{A1}}} \cdot e^{(-j \cdot \varphi_{Zyl})} \cdot n_{KS_{ZA1}}(j\omega)$ (3.19) -- line 35, replace "$n_{KS_{ZA1}}(j\omega) \cdot K_{Zyl} \cdot e^{(-j \cdot \varphi_{Zyl})} = \frac{F_{KS_{A1}}}{F_{KS_{Zyl}}} \cdot n_{KS_{ZZyl}}(j\omega)$ (3.20)"

by -- $n_{KS_{ZA1}}(j\omega) \cdot K_{Zyl} \cdot e^{(-j \varphi_{Zyl})} = \frac{F_{KS_{A1}}}{F_{KS_{Zyl}}} \cdot n_{KS_{ZZyl}}(j\omega)$ (3.20) -- line 53, replace "φ=zero." by --$\varphi$ = zero.--;

UNITED STATES PATENT AND TRADEMARK OFFICE
CERTIFICATE OF CORRECTION

PATENT NO. : 5,709,192       Page 3 of 5
DATED : Jan. 20, 1998
INVENTOR(S) : Zimmermann It is certified that error appears in the above-identified patent and that said Letters Patent is hereby corrected as shown below.

Col. 7,    line 54,    replace "$x_{A1}=K,* x_{B1.}$" by --$x_{A1}=K_1 * x_{B1}$.--;

line 57,    replace "$K_n = \frac{\phi_{x_{Bn}x_{An}}(0)}{\phi_{x_{Bn}x_{Bn}}(0)} = \frac{\sum_{i=0}^{N-1} x_{An}(i) \cdot x_{Bn}(i)}{\sum_{i=0}^{N-1} x_{Bn}^2(i)}$ (3.14)"

by -- $K_n = \frac{\phi_{x_{Bn}x_{An}}(0)}{\phi_{x_{Bn}x_{Bn}}(0)} = \frac{\sum_{i=0}^{N-1} x_{An}(i) \cdot x_{Bn}(i)}{\sum_{i=0}^{N-1} x_{Bn}^2(i)}$ (3.14) --

Col. 8,    line 9,    replace "ϕ" by --φ--;
         line 10,    replace "ϕ=720°." by --φ = 720°.--;

Col. 10,    line 19,    replace "($b_1$)" by --(b1)--;
         line 23,    replace "(a)" by --(a1)--;
         line 25,    replace "($c_1$)" by --(c1)--;
         line 45,    replace "claim 3," by --claim 4,--;
         line 46,    replace "($c_1$)," by --(c1),--;

UNITED STATES PATENT AND TRADEMARK OFFICE
CERTIFICATE OF CORRECTION

PATENT NO. : 5,709,192
DATED : Jan. 20, 1998
INVENTOR(S) : Zimmermann It is certified that error appears in the above-identified patent and that said Letters Patent is hereby corrected as shown below.

Col. 10, line 56, replace "($\phi$)" by --($\varphi$)--;
line 60, replace "($\phi$)" by --($\varphi$)--;
line 66, replace "$x_{Zyl}=K_{Zyl}*x_{BZ.}$" by --$x_{Zyl} = K_{Zyl}*x_{BZ}$--;

Col. 11, line 2, replace "factor (" by --factor--;
line 3, replace "$K_{Zyl})$" by --$(K_{Zyl})$--;

line 5, replace "$K_{Zyl} = \dfrac{\phi_{x_{BZ}x_{Zyl}}(0)}{\phi_{x_{BZ}x_{BZ}}(0)} = \dfrac{\sum\limits_{i=0}^{N-1} x_{Zyl}(i) * x_{BZ}(i)}{\sum\limits_{i=0}^{N-1} x_{BZ}^2(i)}$"

by -- $K_{Zyl} = \dfrac{\phi_{x_{BZ}x_{Zyl}}(0)}{\phi_{x_{BZ}x_{BZ}}(0)} = \dfrac{\sum\limits_{i=0}^{N-1} x_{Zyl}(i) * x_{BZ}(i)}{\sum\limits_{i=0}^{N-1} x_{BZ}^2(i)}$ -- line 15, replace " $K_{Zyl} = \dfrac{\phi_{x_{BZ}x_{Zyl}}(0)}{\phi_{x_{BZ}x_{BZ}}(0)} = \dfrac{\sum\limits_{i=0}^{N-1} x_{Zyl}(i) * x_{BZ}(i)}{\sum\limits_{i=0}^{N-1} x_{BZ}^2(i)}$ "

by -- $K_{Zyl} = \dfrac{\phi_{x_{BZ}x_{Zyl}}(0)}{\phi_{x_{BZ}x_{BZ}}(0)} = \dfrac{\sum\limits_{i=0}^{N-1} x_{Zyl}(i) * x_{BZ}(i)}{\sum\limits_{i=0}^{N-1} x_{BZ}^2(i)}$ --

UNITED STATES PATENT AND TRADEMARK OFFICE
CERTIFICATE OF CORRECTION

PATENT NO. : 5,709,192
DATED : Jan. 20, 1998
INVENTOR(S) : Zimmermann It is certified that error appears in the above-identified patent and that said Letters Patent is hereby corrected as shown below.

Col. 12, line 17, before "generating" insert --(d)--.

Signed and Sealed this

Twenty-sixth Day of May, 1998

Attest:

BRUCE LEHMAN

*Attesting Officer*    *Commissioner of Patents and Trademarks*